United States Patent [19]

McGinley et al.

[11] Patent Number: 5,462,761

[45] Date of Patent: Oct. 31, 1995

[54] MICROCRYSTALLINE CELLULOSE AND GLUCOMANNAN AGGREGATES

[75] Inventors: Emanuel J. McGinley, Morrisville; Domingo C. Tuason, Jr., Bensalem, both of Pa.

[73] Assignee: FMC Corporation, Philadelphia, Pa.

[21] Appl. No.: 175,847

[22] Filed: Apr. 4, 1994

[51] Int. Cl.$^6$ .................. A23L 1/0528; A23L 1/0534
[52] U.S. Cl. .................. 426/573; 426/453; 426/656; 426/804; 426/658
[58] Field of Search .................. 426/96, 99, 573, 426/575, 589, 453, 804, 658, 659, 572, 659

[56] References Cited

U.S. PATENT DOCUMENTS

| | | | |
|---|---|---|---|
| 3,539,365 | 10/1970 | Durand et al. | 106/197 |
| 4,199,368 | 4/1980 | McGinley | 426/573 |
| 4,263,334 | 4/1981 | McGinley | 106/97 |
| 4,911,946 | 3/1990 | Singer et al. | 426/804 |
| 5,098,728 | 3/1992 | Singer et al. | 426/579 |
| 5,171,603 | 12/1992 | Singer et al. | 426/572 |
| 5,192,569 | 3/1993 | McGinley et al. | 426/96 |
| 5,230,918 | 7/1993 | Anderson | 426/572 |

FOREIGN PATENT DOCUMENTS

| | | |
|---|---|---|
| 4243819 | 8/1992 | Japan. |
| 9206591 | 4/1992 | WIPO. |
| 9206619 | 4/1992 | WIPO. |
| 908338 | 5/1992 | WIPO. |

*Primary Examiner*—Jeanette Hunter
*Attorney, Agent, or Firm*—Mark A. Greenfield; Polly E. Ramstad; Robert L. Andersen

[57] ABSTRACT

A composition of matter comprising dry, water-dispersible, particles of microcrystalline cellulose (MCC) coprocessed with a glucomannan. The particles are visually spheroidal, have an average size of about 0.1 to 100 microns, and about 60 to 99 wt % of the total solids of the coated particles comprises MCC. The invention also comprises a process for the manufacture of the inventive composition 1 comprising forming an intimate mixture consisting essentially of MCC and glucomannan in an aqueous medium under controlled agitation, drying the resulting flocculate, and recovering visually spheroidal water dispersible particles. The inventive compositions are useful as bulking agents and fat substitutes, and may have a lipophilic and/or hydrophilic material absorbed thereon.

25 Claims, No Drawings

MICROCRYSTALLINE CELLULOSE AND GLUCOMANNAN AGGREGATES

BACKGROUND OF THE INVENTION

1. Field of the Invention

This invention relates to aggregate compositions comprising microcrystalline cellulose and intimately admixed glucomannan and methods for their manufacture. The compositions are useful as bulking agents and as fat replacers.

2. Description of Related Art

The properties and uses of microcrystalline cellulose (hereafter: MCC) and glucomannan derived from konjac (hereafter: konjac) are each extensively described in the literature, as are various combinations of MCC and of konjac with hydrocolloid gums other than each other.

U.S. Pat. No. 5,192,569—McGinley, et al., discloses the combination of MCC with a galactomannan gum, particularly guar gum or locust bean gum, useful as a bulking agent.

Japanese published patent application 4/243,819 discloses sustained release oral pharmaceutical preparations comprised of 0.1 to 20 wt% glucomannan with 0.1 to 95 wt% natural cellulose.

U.S. Pat. No. 4,911,946—Singer, et al., discloses carbohydrate cream substitute particles whose critical aspects are their slightly spheroidal shape and size of 0.1 to 3 microns. A mixture of cellulose and konjac is disclosed as a theoretical possibility, but there is no enabling disclosure or teaching for this specific mixture.

U.S. Pat. No. 4,263,334—McGinley discloses a water dispersible powder comprising intimately disintegrated beta-1,4-glucan admixed while still in a wet state with a carbohydrate sweetener and a hydrocolloid which may be guar gum, locust bean gum, gum arabic, sodium alginate, propylene glycol alginate, carrageenan, gum karaya, and xanthan gum.

U.S. Pat. No. 4,199,368—McGinley discloses the coating of MCC/CMC with oleaginous and other materials (especially mono- and di-glycerides) in order to render them more easily dispersible in cold water.

U.S. Pat. No. 3,539,365—Durand discloses a water dispersible powder comprising a combination of MCC and sodium CMC in which the CMC acts as a barrier dispersant to prevent agglomeration of the MCC when it is dried from its colloidal (wetcake) form.

PCT published patent applications US92/06591 and US92/06619 disclose and define the "clarified" form of konjac, as that term is used herein.

PCT published patent application US92/06591 also discloses and defines the "cold-melt" form of konjac, as that term is used herein.

PCT published patent application US92/08338 discloses and defines the "rapidly hydratable" form of konjac, as that term is used herein.

SUMMARY OF THE INVENTION

This invention comprises aggregate particles of microcrystalline cellulose (MCC) covered with glucomannan. MCC is a purified alpha cellulose whose physical form has been changed but which is not a chemical derivative; it is manufactured and sold in various grades by FMC Corporation, Philadelphia, Pa., U.S.A. under its trademark Avicel. The glucomannan of this invention is derived from konjac and is manufactured and sold in various grades by FMC Corporation, Philadelphia, Pa, U.S.A. under its trademark Nutricol. Other glucomannans such as those derived from certain species of evergreen are included in this invention, although konjac-derived glucomannan is the most commonly available and is preferred. The inventive particles are particularly distinguished by their generally spheroidal shape (based upon visual observation and not otherwise quantitated), small size, and resistance to dissolution in water or water-based formulations.

The compositions of this invention are manufactured by mixing aqueous slurries or sols of MCC and glucomannan (either separately or together) and coprecipitating particles of an intimately mixed MCC/glucomannan aggregate, preferably by spray drying. In one embodiment, the aqueous konjac sol may be gelled in known manner by adding a gelling-effective amount of an alkali, prior to admixture with the MCC. In another embodiment, the inventive aggregate can have a lipophilic or hydrophilic material adsorbed thereon.

The inventive compositions are particularly useful as bulking agents and as fat replacers, especially in water-based formulations used as foods.

BRIEF DESCRIPTION OF THE DRAWING

The drawing of this invention comprises a single FIGURE which is a graph showing that advantageously the inventive compositions achieve a degree of dispersion in cold water otherwise only achievable upon heating.

DESCRIPTION OF THE PREFERRED EMBODIMENTS

Other than in the operating examples, or where otherwise indicated, all numbers expressing quantities of ingredients, parameters, or reaction conditions used herein are to be understood as modified in all instances by the term "about".

One of the distinguishing characteristics of this invention is that the inventive MCC/glucomannan aggregate behaves quite differently from superficially similar prior art MCC combinations such as MCC/CMC (carboxymethyl cellulose). In the present invention the konjac appears to evidence such affinity for the MCC that the coprocessed dry material unexpectedly does not disperse into individual components of MCC and the glucomannan (konjac) when added to water. Instead, the coprocessed material aggregate particles, which are roughly spheroidal, neither dissolve nor form a sol. For this reason, the spheroidal inventive particles evidence organoleptic properties which are not found in combinations such as MCC/CMC. The inventive compositions also are distinguishable from the combination of MCC/guar gum for reasons demonstrated in the Examples.

The MCC should be present in a solids wt % of 60–99%, preferably 70–90%, more preferably 80–90%, most preferably about 85%, based upon the solids weight of the total MCC/konjac composition.

The average particle size of the inventive dry MCC/glucomannan spheroidal particles is 0.1 to 100 microns, preferably 6 to 90 microns, more preferably 10 to 50 microns, most preferably 12 to 35 microns.

The konjac glucomannan may be native (crude) konjac flour, clarified konjac glucomannan, cold-melt konjac or preferably purified konjac glucomannan, all of which are known in the art.

As a third component, an edible material may optionally be incorporated in the inventive MCC-konjac composition to impart additional properties thereto. This component desirably is a lipophilic or hydrophilic material, wherein the latter material may include proteinaceous substances or polysaccharides, or combinations thereof. The third component is preferably added to the MCC-konjac aggregate before it is dried, thereby forming an adsorption layer thereon.

Among the lipophilic materials which may be employed are vegetable and animal fats, natural butterfat, and partially hydrogenated and hydrogenated products thereof. These materials may be added for the purpose of modifying the surface characteristics of the MCC-konjac aggregate by creating the flavor and taste sensation of fat. This may be accomplished by forming a thin layer of lipophilic coating on the MCC-konjac aggregate to produce substantially insoluble spheroidal particles with flavor and taste characteristics more closely associated with fats. Desirably these lipophilic substances are initially emulsified, for example with a surface active material, in order to be effectively adsorbed on the MCC-konjac and added, with agitation, to an aqueous slurry of the aggregate to form a uniform mixture which may then be dried. The surface active material desirably is used in amounts of about 3.0 to 4.0, preferably about 3.5, percent by weight of the lipophilic material and includes such synthetic and natural hydrophilic and lipophilic emulsifiers as distilled monoglycerides, ethoxylated monoglycerides, mono- and di-glycerides, lecithin, polyoxyethylene sorbitan monoesters such as polyethylene sorbitan monostearate, and the like. To satisfactorily dry this composition, however, preferably by spray drying, a proteinaceous material should also desirably be employed in order to encapsulate the oil-coated MCC-konjac aggregate and obtain effective recovery of the dried powder. This proteinaceous material, which may be added to the slurry before drying, typically comprises about 5–100% by weight, preferably about 40–100%, based on the weight of the lipophilic material. A preferred proteinaceous material is sodium caseinate. Other suitable proteinaceous materials include whey, milk solids, egg albumin, vegetable protein or mixtures thereof. Where desired, these proteinaceous materials may be employed as the sole coating, or in combination with other non-lipophilic materials, of the MCC-konjac aggregate for use in known food formulations.

Polysaccharides, which may be of natural or synthetic origin, may also be employed for purposes of modifying the surface characteristics, for example as stabilizers, and enhancing the taste of the reconstituted food product, as for example maltodextrin, corn syrup, carrageenan, sodium carboxymethyicellulose, xanthan gum, gum tragacanth, sodium alginate, high and low methoxyl pectins, gum agar, gum karaya, gum arabic, or any mixtures thereof. Monosaccharides such as dextrose and fructose also may be used for this purpose.

These added third components may be incorporated in the composition by adsorption on the MCC-konjac particles in amounts sufficient to cover their surface, and provide desired organoleptic and physical characteristics, as for example from about 5 to 45%, preferably about 10 to 30%, based on the total weight of the composition, i.e., the aggregate plus the third component. If desired, selected combinations of these added components may be employed. In one method of preparation, this composition of aggregate and third component may readily be formed by simultaneously admixing an aqueous slurry containing the MCC, konjac and third component, drying the mixture, and recovering the aggregate with the lipophilic or hydrophilic material adsorbed thereon.

Alternatively, the aggregate may be formed separately, followed by coating with a third component. This method is more desirably employed with hydrophilic components, particularly where it is desired to first reduce the aggregate particle size, followed by covering it with a selected surface coating, and then drying the resulting composition.

EXAMPLES

EXAMPLE 1—Manufacture of an Inventive Composition

Attrited microcrystalline cellulose wetcake (988.37 g) obtained from hydrolyzed wood pulp having a particle size range of from 0.1 to 10.0 microns, 50 % of which has a particle size range below 0.2 microns, and with a solids content of 43.0% (referred to hereafter as MCC) was initially dispersed for 15 minutes in 11,425.42 g of distilled water in a colloid mill set at 40 mil clearance with the rotor operating at a rheostat setting of 90 (about 15,000 rpm). Then 86.21 g at 13% moisture of Nutricol® KV80 konjac flour was added to obtain the desired MCC/konjac solids weight ratio of approximately 85:15 and mixed for another 30 minutes in the colloid mill set at 10 mil clearance with the rotor operating at the setting of 120 (about 15,000 rpm). If allowed to stand, samples of the mixture showed a tendency to flocculate, presumably due to interaction between the MCC and the glucomannan. The resulting slurry was passed through a Manton Gaulin homogenizer at 2500 psi (175.75 kg/sq cm) and spray dried to form a powder. The spray drying was performed by feeding the homogenized slurry to a three foot (0.9144 m) Bowen spray dryer utilizing nozzle atomization with a 0.1 inch (0.254 cm) opening. The slurry was fed to the dryer by means of a variable feed Moyno pump at a rate sufficient to provide the desired outlet temperature. The operating inlet/outlet air temperature of the spray dryer was about 255° C./145° C. A substantially water-insoluble, spheroidal MCC/glucomannan powder aggregate was produced. This aggregate had a moisture content of 2.0%, a bulk density of 31.9 lbs/cu ft (51.1 kgs/cu meter), and a particle range of 5 to 80 microns.

EXAMPLE 2—Manufacture of an Inventive Composition (Partial Gel)

The attrited MCC wetcake of Example 1 (1024.10 g) with a solids content of 41.5% was initially dispersed in 3975.9 g of distilled water under an overhead Caframo mixer for 30 min. Separately, a 1% sol of Nutricol konjac 3020 was prepared by dissolving 90.91 g of konjac (at 12% moisture) in 7909.9 g of distilled water in a Groen kettle. This was heated to 180° F. (82° C.) with stirring and then cooled to room temperature. The 1% konjac sol (7500 g) was added to the MCC dispersion and then stirred for 30 minutes to form a slurry. A potassium carbonate solution was prepared and added to the MCC/konjac slurry in sufficient amount to obtain a 10% addition of potassium carbonate based upon the dry weight of the konjac (about 8 g of $K_2CO_3$). This was mixed for an additional 15 min. The slurry partially gelled during this step, as judged by its texture, and also became clear with no evidence of flocculation. The slurry was passed through a Manton Gaulin homogenizer at 2500 psi (175.75 kg/sq cm) and spray dried as in Example 1 except with respective inlet/outlet temperatures of about 170° C./95° C. A substantially water-insoluble spheroidal cellulose/glucomannan coprocessed aggregate was produced, having a moisture content of 3.4%; and a bulk density of 25.8 lbs/cu ft (41.3 kgs/cu meter).

EXAMPLE 3 [Comparative]—Coprocessed MCC and Guar Gum

Attritted MCC wetcake of Example 1 (965.91 g) with a solids content of 38–44% was initially dispersed for 15 minutes in 11,454.64 g of distilled water in a colloid mill set at 40 mil clearance with the rotor operating at 120 rpm. Guar gum no. 60–70, 52.97 g, (5.6 % moisture), obtained from MultiKem Corp., New Jersey, was added to obtain a desired MCC:guar solids weight ratio of 85:15 and mixed for another 30 minutes in the colloid mill set at 10 mil clearance with the motor operating at 120 rpm. The resulting slurry was passed through a Manton Gaulin homogenizer at 6,000 psi (421.8 kg/sq cm) and spray dried to form a powder. The spray drying was performed as follows: The homogenized slurry was fed to a 3 foot (0.9144 meter) Bowen spray dryer utilizing nozzle atomization 0.1 inch (0.254 cm) opening at 90 psi (0.063 kg/sq cm) atomizing air pressure. The slurry was fed to the dryer by means of a variable feed Moyno pump at a rate to provide the desired outlet temperature. The operating inlet/outlet air temperature of the spray dryer was about 200° C. and 110° C., respectively.

EXAMPLE 4 [Comparative]—Coprocessed MCC and Guar Gum

Example 3 was repeated except that the MCC:guar gum ratio was 90:10 and the operating inlet/outlet air temperature of the spray dryer was about 175° C. and 95° C., respectively. A substantially water-insoluble spheroidal MCC/guar powder was produced. This powder was characterized by having a moisture content of 2.8%; a bulk density of 35.7 lbs/sq ft (174.3 kg/cu meter); and a particle size range of 5 to 70 microns.

EXAMPLE 5—Comparison of Examples 1 through 4 [No.1]

The behavior of the materials prepared in Examples 1 through 4 were compared under high-shear conditions. These were designed to simulate the shear normally encountered in food processing. Approximately 12 g of each of the four Examples was placed in a waring blender with 88 g each of deionized water, and the blender was run at 15,000 RPM for about 15 minutes. The texture of each of the resulting slurries was then evaluated, with the results shown below in Table I.

TABLE I

| Example | Gum | % gum | final texture |
| --- | --- | --- | --- |
| 1 | konjac | 15 | smooth, spheroidal particles |
| 2 | konjac | 15 | smooth, spheroidal particles |
| 3 | guar | 15 | fibrous texture, aggregates |
| 4 | guar | 10 | smooth, spheroidal particles |

From the above, it can be seen that the MCC/guar combination was not as good as that of the inventive composition when subjected to high shear (Example 3).

EXAMPLE 6—Comparison of Examples 1 through 4 [No. 2]

The behavior of the materials prepared in Examples 1 through 4 were compared as to their usefulness in masking the chalky taste of MCC when used in a food formulation. Ten g of the product of each of Examples 1 through 10 were added to 90 g of smooth-style commercial peanut butter and blended thoroughly. One hundred g of the same commercial peanut butter was used as a control. The results are shown below in Table II.

TABLE II

| Example | Gum | % gum | texture/taste of peanut butter |
| --- | --- | --- | --- |
| CONTROL | — | 0 | smooth/peanut butter taste |
| 1 | konjac | 15 | smooth/no change from control |
| 2 | konjac | 15 | smooth/no change from control |
| 3 | guar | 15 | gummier texture/chalky note |
| 4 | guar | 10 | smooth/chalky taste |

From the above it can be seen that the MCC/guar combination was unable to mask the chalky taste of the MCC. This was true even where the guar was present in a smaller amount than the konjac to yield a smoother texture (Example 4).

EXAMPLE 7—Preparation Of An Oil-Free Salad Dressing

The inventive spray dried powder, in an amount of 4% by weight, may be mixed with other ingredients to prepare an oil-free salad dressing of the following formulation:

| Ingredients | Amount (Wt %) |
| --- | --- |
| Water | 59.45 |
| Vinegar (white distilled, 50 grain) | 20.00 |
| Sugar | 12.00 |
| Tomato paste (26% solids) | 2.00 |
| MCC/glucomannan powder [INVENTION] | 4.00 |
| Salt | 1.50 |
| Mustard powder | 0.45 |
| Xanthan gum | 0.35 |
| Oleoresin paprika | 0.10 |
| Onion powder | 0.10 |
| Garlic powder | 0.03 |
| Sodium benzoate | 0.02 |
| | 100.00 |

The above oil-free salad dressing should have a fat-like rich texture and consistency similar to that obtained from pourable oil-based dressings.

EXAMPLE 8—Preparation of a Low-Fat Frozen Dessert

The inventive spray dried powder in an amount of 4.0% by weight, also may be used to prepare a low fat, low total solids non-sugar sweetened frozen dessert using the following formulation:

| Ingredients | Grams |
| --- | --- |
| Skim milk | 2,369.15 |
| Whole milk | 500.00 |
| MSNF[1] | 128.35 |
| Sorbitol | 350.00 |
| Aspartame | 1.65 |
| MCC/konjac powder [INVENTION] | 140.00 |
| CMC-7MF[2] | 8.75 |
| Carrageenan | 0.35 |
| (4:1) Mono-diglycerides/ Polysorbate 80[3] | 1.75 |
| | 3,500.00 |

[1]milk solids - nonfat
[2]a medium viscosity carboxymethylcellulose
[3]polyoxyethylene (20) sorbitan monooleate (ICI)

The above low-fat aspartame-sweetened frozen dessert product (with approximately 0.5% butterfat) prepared with the inventive MCC/konjac glucomannan composition should exhibit a smooth and creamy fat-like textural quality similar to that prepared from a conventional 4% butterfat ice milk.

EXAMPLE 9—Preparation of Lipophilic Aggregates

If optional ingredients such as a lipophilic material are desired, for the sake of modifying the surface characteristics of the MCC/glucomannan spheroids, the lipophilic material must be initially emulsified for effective adsorption onto and around the inventive MCC/konjac glucomannan aggregates to produce insoluble spherical particles with flavor and taste characteristics more closely associated with fats. To form such a blend, a lipophilic material such as a hydrogenated fat and a surface active material may be combined by heating the mixture to melt the hydrogenated fat. The fat/surfactant blend, which has been emulsified in water, is then added to the inventive MCC/konjac composition and the final mixture homogenized prior to drying.

More specifically, attrited MCC and konjac may be used to prepare an aqueous slurry according to this invention having an MCC:konjac solids weight ratio of 85:15. The slurry would then be mixed for another 30 minutes in a colloid mill set at 10 mil clearance with the rotor operating at 120 rpm. The slurry would then be transferred to a steam jacketed kettle and heated to about (80° C.). A hydrogenated fat such as "Paramount B" from Durkee Food Co. in an amount of 50 g and an emulsifier such as polyethylene (20) sorbitan monostearate in the amount 1.8 g, would be combined by heating the fat/emulsifier mixture to a temperature sufficient to melt the hydrogenated fat. The fat/emulsifier blend would then be added to the MCC/konjac slurry and mixed for 30 minutes at about 80° C. Sodium caseinate, 5.21 g (4.0% moisture) would be added and mixed for another 15 minutes, and the resulting emulsion passed through a homogenizer and spray dried to form a cold-water dispersible, lipo-coated embodiment of the inventive composition.

EXAMPLE 10—Preparation of a Low-Fat Salad Dressing

The lipophilic aggregate embodiment of this invention could be used in the following salad dressing formulation:

| Ingredients | Amount (Wt %) |
| --- | --- |
| Water | 59.45 |
| Vinegar (white distilled, 50 grain) | 20.00 |
| Sugar | 12.00 |
| Tomato paste (26% solids) | 2.00 |
| Lipo-coated MCC/konjac powder [INVENTION] | 4.00 |
| Salt | 1.50 |
| Mustard powder | 0.45 |
| Xanthan gum | 0.35 |
| Oleoresin paprika | 0.10 |
| Onion powder | 0.10 |
| Garlic powder | 0.03 |
| Sodium benzoate | 0.02 |
| | 100.00 |

A salad dressing product (containing only 0.4% fat) prepared with the lipo-coated embodiment of the inventive composition would be expected to have a fat-like rich texture and consistency similar to those obtained from pourable 12% oil-based dressings.

We claim:

1. A composition of matter comprising dry, water-dispersible, aggregate particles of microcrystalline cellulose (MCC) and a glucomannan which particles are coated by the glucomannan and wherein the MCC is from about 60 to 99 weight percent based on the solids weight of the total composition.

2. The composition of claim 1 wherein the glucomannan is a konjac-derived glucomannan (konjac).

3. The composition of claim 1 wherein about 70 to 95 weight percent of the total solids of the aggregate particles comprises MCC.

4. The composition of claim 1 wherein the particles are visually spheroidal.

5. The composition of claim 1 wherein the MCC is of colloidal size.

6. The composition of claim 1 wherein the average size of said particles is about 0.1 to 100 microns.

7. The composition of claim 1 wherein the average size of said particles is about 5 to 15 microns.

8. The composition of claim 1 wherein the coated particles are generally spheroidal, have an average size of about 0.1 to 100 microns, and are coated by konjac.

9. The composition of claim 8 wherein said particles have an average size of from more than 5 to 35 microns, and about 70 to 90 weight percent of the total solids of said particle comprises MCC.

10. The composition of claim 1 having absorbed thereon a lipophilic or hydrophilic material.

11. The composition of claim 2 having adsorbed thereon a lipophilic or hydrophilic material, or combinations thereof.

12. The composition of claim 11 wherein the lipophilic material is vegetable fat, animal fat, partially hydrogenated and hydrogenated products thereof, or mixtures thereof.

13. The composition of claim 11 wherein the hydrophilic material is a proteinaceous material and is sodium caseinate, whey, egg albumin, vegetable protein, or mixtures thereof.

14. The composition of claim 11 wherein the hydrophilic material is a polysaccharide and is maltodextrin, corn syrup, carrageenan, sodium carboxymethylcellulose, xanthan gum, gum tragacanth, sodium alginate, high and low methoxyl pectins, gum agar, gum karaya, gum arabic, or mixtures thereof.

15. The composition of claim 11 wherein the hydrophilic material is milk solids.

16. A process for the manufacture of the composition of claim 1 comprising forming an intimate mixture of MCC and glucomannan in an aqueous medium under controlled agitation, drying the flocculate which results from forming the intimate mixture, and recovering the water-dispersible aggregate particles.

17. The process of claim 16 wherein the aggregate particles are visually spheroidal in shape.

18. The process of claim 17 wherein the flocculate is spray dried.

19. The process of claim 17 wherein prior to drying, the intimate mixture is treated with a food grade alkali in a gel-forming effective amount.

20. The process of claim 19 wherein said alkali is an alkali metal inorganic salt.

21. The process of claim 19 wherein the amount of alkali is sufficient to impart a pH of about 7.5 to 10 to the mixture.

22. A normally fat-containing foodstuff comprising the composition of claim 1 contained therein as a fat substitute.

23. A foodstuff comprising the composition of claim 1 contained therein as a bulking agent.

24. The use of the composition of claim 1 as a bulking agent or fat substitute.

25. A composition of matter comprising dry, water-dispersible, aggregate particles of microcrystalline cellulose (MCC) and a glucomannan which particles are coated by the glucomannan, wherein the MCC is from about 60 to 99 weight percent based on solids weight of the total composition, upon which aggregate particles a lipophilic or hydrophilic material has been adsorbed.

* * * * *